United States Patent [19]

Okada et al.

[11] 4,186,122
[45] Jan. 29, 1980

[54] ELECTRICAL INSULATING COATINGS

[75] Inventors: Yasunori Okada; Yuichi Osada; Mineo Nakano; Shozo Kasai; Shigeo Tachiki; Nobuyuki Hayashi; Masahiro Abo, all of Hitachi, Japan

[73] Assignee: Hitachi Chemical Company, Ltd., Japan

[21] Appl. No.: 828,658

[22] Filed: Aug. 29, 1977

[30] Foreign Application Priority Data

Sep. 3, 1976 [JP] Japan .............................. 51-105633
Jun. 17, 1977 [JP] Japan .............................. 52-72550

[51] Int. Cl.$^2$ .............................................. C08K 5/10
[52] U.S. Cl. ........................ 260/31.4 R; 260/31.6; 260/33.2 R
[58] Field of Search ............ 260/31.4 R, 31.6, 33.2 R; 528/289

[56] References Cited

U.S. PATENT DOCUMENTS

| | | | |
|---|---|---|---|
| 3,519,577 | 7/1970 | Olson | 260/33.2 R |
| 3,533,972 | 10/1970 | Pawlak | 260/31.4 R |
| 3,549,577 | 12/1970 | Stromberg | 260/33.2 R |
| 3,597,495 | 8/1971 | Sekmakas | 260/31.4 R |
| 3,668,275 | 6/1972 | Riemhofer | 260/31.6 |
| 3,896,070 | 7/1975 | Tummler | 260/31.4 R |
| 3,920,595 | 11/1975 | Anderson | 260/31.4 R |
| 3,975,330 | 8/1976 | Suzuki | 528/289 |
| 4,042,539 | 8/1977 | Fanning | 260/31.4 R |
| 4,069,209 | 1/1978 | Lange | 528/289 |

OTHER PUBLICATIONS

The Condensed Chemical Dictionary, 5th Edition, Reinhold Pub. Co., New York, 1961, pp. 188, 457, 458, 529, 714.

Primary Examiner—Paul R. Michl
Attorney, Agent, or Firm—Craig and Antonelli

[57] ABSTRACT

A polyester resin, polyester-imide resin or polyester-amide-imide resin dissolved in a solvent containing 60% by weight or more of at least one polyhydric alcohol derivative selected from the group consisting of $R_1COO(CHR_2CH_2O)_nH$, $R_1COO(CHR_2CH_2O)_nCOR_3$, $R_1O(CHR_2CH_2O)_nCOR_3$ and $R_1O(CHR_2CH_2O)_nR_4$, wherein $R_1$, $R_3$ and $R_4$ are independently lower alkyl, aryl or aralkyl; $R_2$ is hydrogen or methyl; and n is an integer of 1 to 3, gives an electrical insulating coating having excellent storage stability and high resin concentration without causing defects of phenols when used as a solvent.

8 Claims, No Drawings

ELECTRICAL INSULATING COATINGS

This invention relates to an electrical insulating coating composition containing one or more polyhydric alcohol derivatives as a solvent.

Presently, polyester resin coatings, polyurethane resin coatings and the like are used as general-purpose electrical insulating coatings. With a proceeding of miniaturization, weight-saving and high-performance of apparatuses, insulating coatings having excellent properties have been required. Thus, demand for polyesterimide resin coatings or polyester-amide-imide resin coatings having heat resistance imide groups and amide groups is increasing.

As a major solvent for these resin coatings, phenols such as cresol, phenol, xylenol and the like have been used. But these phenols have many defects in that they have strong irritating smell, there is a danger of producing a burn when they are touched on the skin, there should take great care for handling them, and the like. Further, the phenols do not participate in forming coating films when evaporated in a baking furnace. In general, in order to prevent the evaporated phenols from diffusion into the air, they are treated by using a catalyst combustion apparatus attached to the baking furnace but combustion efficiency of the apparatus is insufficient.

On the other hand, a resin concentration in an insulating coating is generally 20 to 40% by weight and the remaining 80 to 60% by weight of cresol and aromatic organic solvents for dilution evaporate in a baking furnace and do not participitate in forming coating films.

Recently, there arises a problem of a drain upon the petroleum resources together with remarkable rise of price of chemical raw materials including the solvents mentioned above. Therefore, it is desirable to use a solvent, which cannot be a component of forming film, as small as possible from viewpoints of saving resources and lowering production cost.

The present inventors have found that a resin produced by reacting one or more polyvalent carboxylic acids or their derivatives with one or more polyhydric alcohols can be dissolved in a solvent containing 60% by weight or more of at least one special polyhydric alcohol derivative to give electrical insulating coatings having a good storage stability and a higher resin concentration than conventional coatings and overcoming the defects of phenol type solvents, and accomplished this invention.

This invention provides an electrical insulating coating composition comprising a resin prepared by reacting one or more polyvalent acids or their derivatives with one or more polyhydric alcohols and a solvent containing 60% by weight or more of at least one polyhydric alcohol derivative selected from the group consisting of $R_1COO(CHR_2CH_2O)_nH$,
$R_1COO(CHR_2CH_2O)_nCOR_3$,
$R_1O(CHR_2CH_2O)_nCOR_3$ and
$R_1O(CHR_2CH_2O)_nR_4$ wherein $R_1$, $R_3$ and $R_4$ are independently lower alkyl, aryl or aralkyl; $R_2$ is hydrogen or methyl; and n is an integer of 1 to 3.

In the above formulae of polyhydric alcohol derivatives, the term "lower alkyl" includes, for example, alkyl having 1 to 6 carbon atoms such as methyl, ethyl, propyl, isopropyl, butyl, pentyl and hexyl; the term "aryl" includes, for example, phenyl, tolyl, xylyl, naphthyl, biphenyl, and the like; and the term "aralkyl" includes, for example, benzyl, phenylethyl, phenylpropyl, phenylbutyl, and the like.

As to the resin used in this invention, it is preferable to use one or more tri- or higher polyhydric alcohols in an amount of 35% by equivalent or more based on the total hydroxyl group equivalent of the polyhydric alcohol component in order to react the acid component with the alcohol component. If the tri- or higher polyhydric alcohols are used less than 35% by equivalent based on the total hydroxyl group equivalent of the polyhydric alcohol component, the resulting resin is dissolved with difficulty in the solvent containing 60% by weight or more of at least one polyhydric alcohol derivative mentioned above.

In the reaction of one more polyvalent carboxylic acids or their derivatives with one or more polyhydric alcohols, it is preferable to terminate the reaction at a Gardner viscosity of T–$Z_3$ at 25° C., more preferably V–Z at 25° C., when measured in a cresol solution containing 40% by weight of the resin sampled. If the reaction is terminated before Gardner viscosity of T, heat resistance of the resulting coating becomes insufficient, and if terminated later than Gardner viscosity of $Z_3$, storage stability of the resulting coating lowers.

Examples of polyvalent carboxylic acids or their derivatives are terephthalic acid, isophthalic acid, orthophthalic acid, trimellitic acid, hemimellitic acid, pyromellitic acid, benzophenone tetracarboxylic acid, 1,2,3,4,-butanetetracarboxylic acid, maleic acid, adipic acid, succinic acid, amide-imide acids containing amide bonds and imide rings in the molecule represented by the formula:

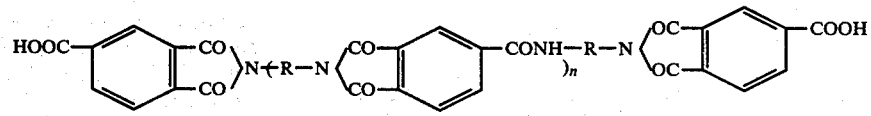

wherein n is 0.25 to 4; and R is a divalent organic group, imide dicarboxylic acids containing one or more imide rings in the molecules represented by the formulae:

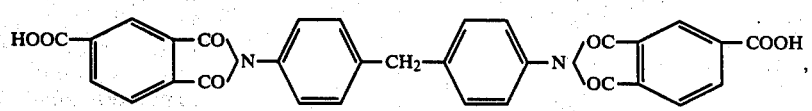

-continued

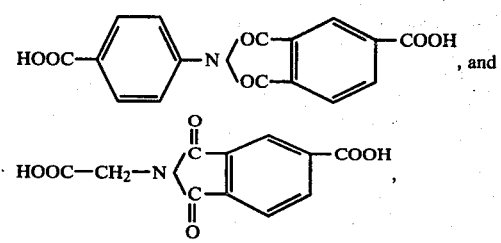

acid anhydrides of these polyvalent carboxylic acids, esters of these polyvalent carboxylic acids, and the like.

Examples of polyhydric alcohols are ethylene glycol, diethylene glycol, triethylene glycol, propylene glycol, dipropylene glycol, tripropylene glycol, 1,3-butanediol, 1,4-butanediol, 1,3-propanediol, 1,6-hexanediol, neopentyl glycol, trimethylolethane, trimethylolpropane, glycerin, pentaerythritol, diglycerin, dipentaerythritol, tris(2-hydroxyethyl) isocyanurate, and the like.

The reaction of one or more polyvalent carboxylic acids or their derivatives with one or more polyhydric alcohols can easily be carried out by a conventional process. There is no limitation in reaction methods. For example, the reaction can be carried out at a temperature of 150°–230° C. for 5–8 hours under a nitrogen atmosphere.

The solvent used in this invention is that contains 60% by weight or more of at least one polyhydric alcohol derivative.

Examples of the polyhydric alcohol derivatives of the formula:

$R_1COO(CHR_2CH_2O)_nH$ wherein $R_1$, $R_2$ and $n$ are as defined above, are ethylene glycol monoacetate, ethylene glycol monopropionate, propylene glycol monoacetate, diethylene glycol monoacetate, dipropylene glycol monoacetate, triethylene glycol monoacetate, and the like.

Examples of the polyhydric alcohol derivatives of the formula:

$R_1COO(CHR_2CH_2O)_nCOR_3$ wherein $R_1$, $R_2$, $R_3$ and $n$ are as defined above, are ethylene glycol diacetate, propylene glycol diacetate, diethylene glycol diacetate, triethylene glycol diacetate, and the like.

Examples of the polyhydric alcohol derivatives of the formula:

$R_1O(CHR_2CH_2O)_nR_4$ wherein $R_1$, $R_2$, $R_4$ and $n$ are as defined above, are ethylene glycol dimethyl ether, ethylene glycol diethyl ether, ethylene glycol dipropyl ether, ethylene glycol dibutyl ether, propylene glycol dimethyl ether, diethylene glycol dimethyl ether, diethylene glycol diethyl ether, diethylene glycol methylethyl ether, diethylene glycol dipropyl ether, diethylene glycol dibutyl ether, and the like.

Examples of the polyhydric alcohol derivatives of the formula:

$R_1O(CHR_2CH_2O)_nCOR_3$ wherein $R_1$, $R_2$, $R_3$ and $n$ are as defined above, are ethylene glycol monomethyl ether acetate, ethylene glycol monoethyl ether acetate, ethylene glycol monoisopropyl ether acetate, ethylene glycol monobutyl ether acetate, diethylene glycol monomethyl ether acetate, diethylene glycol monoethyl ether acetate, diethylene glycol monoisopropyl ether acetate, diethylene glycol monobutyl ether acetate, triethylene glycol monomethyl ether acetate, triethylene glycol monoethyl ether acetate, propylene glycol monomethyl ether acetate, propylene glycol monoethyl ether acetate, propylene glycol monoisopropyl ether acetate, dipropylene glycol monomethyl ether acetate, and the like.

These polyhydric alcohol derivatives can be used alone or as a mixture of two or more of them.

As the other solvent used in combination with the polyhydric alcohol derivative, there may be used xylene, Hisol 100, Hisol 150 (trade name for mixtures of aromatic hydrocarbons having high boiling points manufactured by Nippon Oil Co., Ltd.), xylenol, N-methyl-2-pyrrolidone, dimethyl acetamide, dimethyl formamide, cresol, and the like.

Electrical insulating coatings can be obtained by dissolving the resin prepared as mentioned above in an amount of 30–70% by weight in the solvent containing 60% by weight or more of at least one polyhydric alcohol derivative as mentioned above in an amount of 70–30% by weight. The resin concentration of 40–70% by weight is preferable from a viewpoint of workability.

It is preferable to add a curing agent to the coating composition in order not only to accelerate curing at baking but also to improve physical and chemical properties of the resulting coating film. As the curing agent, there may be used organic titanium compounds usually used in electrical insulating coatings such as tetrabutyl titanate, tetraisopropyl titanate, tetraphenyl titanate, bistriethanolamino titanate, bisethyl aceto acetate dibutyl titanate, bisacetyl acetono dibutyl titanate, and the like.

Further the coating composition of this invention may contain block isocyanate compounds such as CT Stable (Bayer A. G.), MS-50, DD-APS, Coronate 2501 (trade names, manufactured by Nippon Polyurethane Co.), and the like; metal salts of organic acids such as cobaltous naphthenate, zinc naphthenate, zinc octoate, manganese octoate, tin octoate, and the like; and other conventional additives such as phenolic resins and melamine resins.

According to this invention, there are obtained electrical insulating coatings having good various properties as general-purpose electrical insulating coatings, an no irritating smell. Since phenols are not used in the coatings, handling is very easy and there is no danger of producing a burn when touched on the skin. Further combustion efficiency of the solvent is very excellent comparing with known coatings using phenols as a solvent.

This invention is illustrated by way of the following Examples, in which all percents are by weight unless otherwise specified.

EXAMPLE 1

In a 1-liter four-necked flask equipped with a condenser, a thermometer, a nitrogen introducing pipe and a stirrer, 493 g of dimethyl terephthalate, 105 g of isophthalic acid, 74 g of ethylene glycol, 146 g of glycerin, 42 g of diethylene glycol and 0.9 g of tetrabutyl titanate were placed and the reaction was carried out while raising the temperature from 150° C. to 225° C. gradually for 6 hours under a nitrogen atmosphere. During the reaction, by-produced methanol and water were taken out of the reaction system through the condenser. When the temperature became 225° C., a sample was taken from the contents of the flask, while maintaining said temperature, to measure a Gardner viscosity in a cresol solution containing 40% by weight of the resin samples. (In the following Examples, Gardner viscosities were measured in the same way.) When a Gardner viscosity became X-Y, heating was stopped and the flask was cooled. To the contents, 344 g of ethylene glycol monoethyl ether acetate and 31 g of bisacetyl acetono dibutyl titanate were added. The thus obtained coating composition had a resin concentration of 60% and viscosity of 61 poise at 30° C.

EXAMPLE 2

In the same manner as described in Example 1, 455 g of dimethyl terephthalate, 97 g of isophthalic acid, 82 g of ethylene glycol, 78 g of 1,6-hexanediol, 148 g of glycerin and 0.9 g of tetrabutyl titanate were reacted. When a Gardner viscosity became X, heating was stopped and the flask was cooled. To the contents, 340 g of ethylene glycol monoethyl ether acetate was added and further 32 g of bisacetyl acetono dibutyl titanate, 0.7 g of zinc naphthenate and 13 g of CT Stabie were added. The thus obtained coating composition had a resin concentration of 61% and viscosity of 58 poise at 30° C.

EXAMPLE 3

In the same manner as described in Example 1, 61 g of glycerin, 62 g of ethylene glycol, 116 g of tris(2-hydroxyethyl) isocyanurate, 79 g of 1,6-hexanediol, 392 g of dimethyl terephthalate, 88 g of isophthalic acid and 0.8 g of tetrabutyl titanate were reacted. When a Gardner viscosity became Y$^-$, heating was stopped and the flask was cooled. To the contents, 330 g of ethylene glycol monomethyl ether acetate was added and further 38 g of bisethyl aceto acetate dibutyl titanate was added. The thus obtained coating composition had a resin concentration of 60% and viscosity of 62 poise at 30° C.

EXAMPLE 4

In the same manner as described in Example 1, 145 g of glycerin, 73 g of ethylene glycol, 31 g of propylene glycol, 521 g of dimethyl terephthalate, 79 g of isophthalic acid and 0.9 g of tetrabutyl titanate were reacted. When a Gardner viscosity became X$^+$, heating was stopped and the flask was cooled. To the contents, 268 g of ethylene glycol monoethyl ether acetate and 67 g of ethylene glycol monobutyl ether acetate were added and further 31 g of bisacetyl acetono dibutyl titanate was added. The thus obtained coating composition had a resin concentration of 60% and viscosity of 56 poise at 30° C.

EXAMPLE 5

In the same manner as described in Example 1, 145 g of glycerin, 34 g of ethylene glycol, 86 g of 1,6-hexanediol, 453 g of dimethyl terephthalate, 97 g of isophthalic acid and 0.8 g of tetrabutyl titanate were reacted. When a Gardner viscosity became X-Y, heating was stopped and the flask was cooled. To the contents, 261 g of ethylene glycol monoethyl ether acetate and 65 g of xylene were added and further 30 g of bisacetyl acetono dibutyl titanate and 0.65 g of zinc naphthenate were added. The thus obtained coating composition had a resin concentration of 61% and viscosity of 52 poise at 30° C.

The coating compositions obtained in Examples 1 to 5 were coated on copper wires having a diameter of 1 mm and baked at temperatures 300° C./350° C./400° C. (at entrance/the middle/exit) with linear speed 8 m/min. and the coating and baking procedures were repeated 5 times. Various properties of the enamelled wires were measured with the results as shown in Table 1. For comparison, a conventional polyester coating having a resin concentration of 40% was coated and baked 6 times as mentioned above. The resulting enamelled wire had the properties as shown in Table 1.

Table 1

| Example No. | 1 | 2 | 3 | 4 | 5 | Comparison |
|---|---|---|---|---|---|---|
| Dimension of bare wire (mm) | 1.002 | 1.002 | 1.002 | 1.002 | 1.002 | 1.002 |
| Dimension of film thickness (mm) | 0.041 | 0.041 | 0.041 | 0.041 | 0.041 | 0.039 |
| Number of passes of coating and backing (times) | 5 | 5 | 5 | 5 | 5 | 6 |
| Flexibility: Mandrel test at 20% elongation (crack) | 1X OK | 1X OK | 1X OK | 1X OK | 1X OK | 1X OK |
| Cut through temperature (load 2 kg) (°C.) | 338 | 336 | 321 | 340 | 336 | 301 |
| Abrasion resistance (repeated scrapes) (load 600 g) (times) | 38 | 36 | 37 | 38 | 38 | 37 |
| Heat-shock (150° C. - 1 hour) | 3X OK | 2X OK | 2X OK | 3X OK | 3X OK | 3X OK |
| Thermal degradation (200° C. - 6 hours) (crack) | 1X OK | 1X OK | 1X OK | 1X OK | 1X OK | 1X OK |

Test methods are as follows:

Cut through temperature:

Two enamelled wires of about 10 cm long were placed on a flat plate so that one was placed over the other at a right angle. On the piled part of the wires, a weight having a prescribed mass was placed and put in a thermostat in this state. The temperature in the thermostat was raised at a rate of 3° C./min. A temperature at which the wire faulted was measured. The other properties: JIS-C-3003 and JIS-C-3210

As is clear from Table 1, the coating compositions according to this invention show the same or more excellent properties comparing with the conventional polyester coating composition.

EXAMPLE 6

In a 2-liter four-necked flask equipped with a condenser, a thermometer, a nitrogen introducing pipe and a stirrer, 141 g of ethylene glycol, 219 g of glycerin, 76 g of 1,6-hexanediol, 698 g of dimethyl terephthalate, 166 g of isophthalic acid, 79 g of diaminodiphenylmethane, 154 g of trimellitic anhydride and 1.5 g of tetrabutyl titanate were placed and the reaction was carried out while raising the temperature from 150° C. to 225° C. gradually for 4 hours under a nitrogen atmosphere. During the reaction, by-produced methanol and water were taken ot of the reaction system through the condenser. When the temperature became 225° C., a sample was taken from the contents of the flask, while maintaining said temperature, to measure a Gardner viscosity. When a Gardner viscosity became X-Y, heating was stopped and the flask was cooled. 400 Grams of resin out of the thus produced resin was taken out and 360 g of diethylene glycol dimethyl ether, 16 g of tetrabutyl titanate and 4 g of zinc naphthenate were added thereto. The thus obtained coating composition had a resin concentration of 51%.

EXAMPLE 7

To 400 g of the resin obtained in Example 6, 200 g of diethylene glycol diethyl ether, 160 g of ethylene glycol diacetate and 16 g of tetrabutyl titanate were added. The thus obtained coating composition had a resin concentration of 51%.

EXAMPLE 8

To 400 g of the resin obtained in Example 6, 260 g of diethylene glycol diethyl ether, 100 g of ethylene glycol monoacetate and 16 g of tetrabutyl titanate were added. The thus obtained coating composition had a resin concentration of 51%.

EXAMPLE 9

In the same manner as described in Example 6, 95 g of ethylene glycol, 95 g of glycerin, 338 g of dimethyl terephthalate, 72 g of isophthalic acid and 0.6 g of tetrabutyl titanate were reacted. When a Gardner viscosity became Y+, heating was stopped and the flask was cooled. To the contents, 440 g of diethylene glycol dibutyl ether, 2 g of zinc naphthenate, 16 g of tetrabutyl titanate and 4 g of CT Stable (trade name, manufactured by Bayer A. G.) were added. The thus obtained coating composition had a resin concentration of 50%.

EXAMPLE 10

In the same manner as described in Example 6, 50 g of ethylene glycol, 196 g of glycerin, 183 g of adipic acid, 185 g of phthalic anhydride and 0.6 g of tetrabutyl titanate were reacted. When a Gardner viscosity became T, heating was stopped and the flask was cooled. To the flask, 500 g of diethylene glycol dimethyl ether was added. From the resulting solution, 200 g of the solution was taken and 330 g of DD-APS (trade name, manufactured by Nippon Polyurethane Co.; containing 60% solution of cresol and xylene) was added thereto and further 320 g of diethylene glycol dimethyl ether and 1 g of zinc naphthenate were added thereto. The thus obtained coating composition had a resin concentration of 35%.

EXAMPLE 11

In the same manner as described in Example 6, 79 g of ethylene glycol, 221 g of tris(2-hydroxyethyl) isocyanurate, 247 g of dimethyl terephthalate, 52 g of isophthalic acid and 0.6 g of tetrabutyl titanate were reacted. When a Gardner viscosity became X—Y, heating was stopped and the flask was cooled. To the contents, 195 g of diethylene glycol dimethyl ether, 195 g of diethylene glycol diethyl ether, 15 g of tetrabutyl titanate and 6 g of zinc naphthenate were added. The thus obtained coating composition had a resin concentration of 50%.

The coating compositions obtained in Examples 6, 9, 10 and 11 were coated on copper wires having a diameter of 0.4 mm or 1.0 mm and baked according to the method described previously (Example 5 and Table 1). Various properties of the enamelled wires were measured with the results as shown in Table 2.

Table 2

| Example No. | 6 | 9 | 10 | 11 |
|---|---|---|---|---|
| Dimension of bare wire (mm) | 1.000 | 1.000 | 0.400 | 1.000 |
| Dimension of film thickness (mm) | 0.041 | 0.041 | 0.018 | 0.041 |
| Flexibility: Mandrel test at 20% elongation (crack) | 1X OK | 1X OK | 1X OK | 1X OK |
| Heat-shock (150° C. - 1 hour) (crack) | 3X OK | 4X OK | 1X OK | 2X OK |
| Cut through temperature (load 2 kg) (°C.) | 320 | 310 | 235* | 361 |

Note) *Load 300 g

As is clear from Table 2, the coating compositions according to this invention show the same or more excellent properties comparing with conventional coating compositions.

As is clear from the explanations mentioned above, if the coatings of this invention are touched on the skin by mistake, no burn is produced, and since a resin concentration of the coatings is very high, enamelled wires with the desired thickness of the coated film can be obtained with less times of repeating of coating and baking procedures comparing with the known coatings. Further since the proportion of non-volatile materials is very high in the coatings and thus the solvent, which does not participate in the formation of coating film, is used rather in smaller amount, the production cost for enamelled wires can advantageously be reduced and the saving of resources can also be attained.

What is claimed is:

1. An electrical insulating composition consisting essentially of a polyester-amide-imide resin or a polyester-imide resin prepared by reacting a polyvalent carboxylic acid from the group consisting of (a) amide-imide acids containing amide bonds and imide rings in the molecule represented by the formula

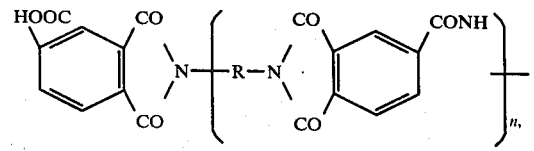

-continued

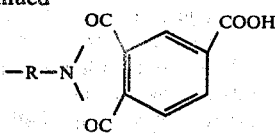

wherein n, is 0.25 to 4; and R is a divalent organic group; (b) imide dicarboxylic acids containing one or more imide rings in the molecules represented by the formulas:

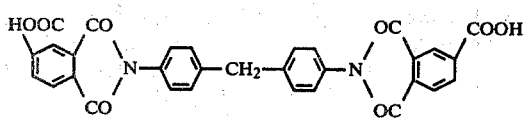

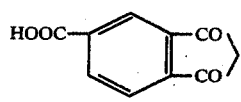

, and

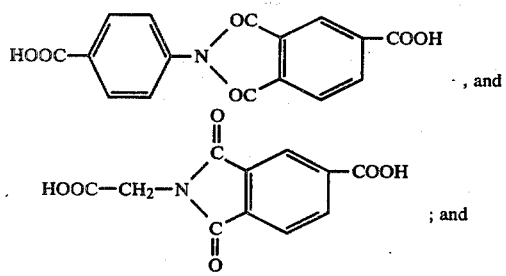

; and (c) mixtures of (a) and (b), together with (d) at least one polyvalent carboxylic acid or its derivative other than (a) and (b), with at least one polyhydric alcohol and a solvent containing at least 60% by weight of a polyhydric alcohol derivative selected from the group consisting of $R_1COO(CHR_2CH_2O)_{n2}H$,
$R_1COO(CHR_2CH_2O)_{n2}COR_3$,
$R_1O(CHR_2CH_2O)_{n2}COR_3$,
$R_1O(CHR_2CH_2O)_{n2}R_4$, and mixtures thereof, wherein $R_1$, $R_3$ and $R_4$ are independently lower alkyl, aryl or aralkyl; $R_2$ is hydrogen or methyl; and $n2$ is an integer of 1 to 3.

2. An electrical insulating composition according to claim 1 wherein the polyvalent carboxylic acid or its derivative (d) is selected from the group consisting of terephthalic acid, isophthalic acid, orthophthalic acid, trimellitic acid, hemimellitic acid, pyromellitic acid, benzophenone tetracarboxylic acid, 1,2,3,4-butanetetracarboxylic acid, maleic acid, adipic acid, and succinic acid.

3. A composition according to claim 1, wherein said at least one polyhydric alcohol comprises at least 35% by equivalent, based upon the total hydroxyl group equivalent of the at least one polyhydric alcohol, of one or more tri- or higher polyhydric alcohols, whereby the resulting resin is easily dissolved in the solvent.

4. An electrical insulating coating composition consisting essentially of a polyester-amide-imide resin prepared by reacting a polyvalent carboxylic acid containing amide bonds and imide rings in the molecule represented by the formula:

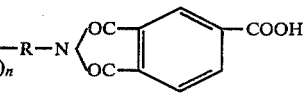

wherein n is 0.25 to 4 and R is a divalent organic group and at least one polyvalent carboxylic acid or its derivative, other than said polyvalent carboxylic acid containing amide bonds and imide rings with one or more polyhydric alcohols selected from the group consisting of ethylene glycol, diethylene glycol, triethylene glycol, propylene glycol, dipropylene glycol, tripropylene glycol, 1,3-butanediol, 1,4-butanediol, 1,3-propanediol, 1,6-hexanediol, neopentyl glycol, trimethylolethane, trimethylolpropane, glycerin, pentaerythritol, diglycerin, dipentaerythritol, and tris(2-hydroxyethyl) isocyanurate and a solvent containing 60% by weight or more of at least one polyhydric alcohol derivative selected from the group consisting of $R_1COO(CHR_2CH_2O)_nH$,
$R_1COO(CHR_2CH_2O)_nCOR_3$,
$R_1O(CHR_2CH_2O)_nCOR_3$ and
$R_1O(CHR_2CH_2O)_nR_4$ wherein $R_1$, $R_3$ and $R_4$ are independently lower alkyl, aryl or aralkyl; $R_2$ is hydrogen or methyl; and n is an integer of 1 to 3.

5. An electrical insulating coating composition consisting essentially of a polyester-imide resin prepared by reacting one or more polyvalent carboxylic acid containing imide rings in the molecules represented by the formulas:

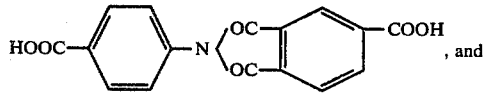

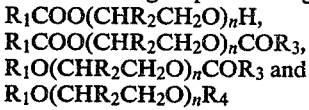
, and

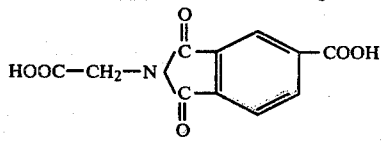

and at least one polyvalent carboxylic acid or its derivative, other than said polyvalent carboxylic acid containing imide rings with one or more polyhydric alcohols selected from the group consisting of ethylene glycol, diethylene glycol, triethlene glycol, propylene glycol, dipropylene glycol, tripropylene glycol, 1,3-butanediol, 1,4-butanediol, 1,3-propanediol, 1,6-hexanediol, neopentyl glycol, trimethylolethane, trimethylolpropane, glycerin, pentaerythritol, diglycerin, dipentaerythritol, and tris(2-hydroxyethyl) isocyanurate and a solvent containing 60% by weight or more of at least one polyhydric alcohol derivative selected from the group consisting of $R_1COO(CHR_2CH_2O)_nH$,
$R_1COO(CHR_2CH_2O)_nCOR_3$,
$R_1O(CHR_2CH_2O)_nCOR_3$ and
$R_1O(CHR_2CH_2O)_nR_4$ wherein $R_1$, $R_3$ and $R_4$ are independently lower alkyl, aryl or aralkyl; $R_2$ is hydrogen or methyl; and n is an integer of 1 to 3.

6. A composition according to claim 1, wherein the polyester-imide resin is prepared by reacting dimethyl terephthalate, isophthalic acid, trimellitic anhydride and diaminodiphenylmethane with ethylene glycol, glycerin and 1,6-hexanediol.

7. A composition according to claim 6, wherein the polyester-imide resin is dissolved in a solvent selected from the group consisting of diethylene glycol dimethyl ether and ethylene glycol monoacetate.

8. A composition according to claim 6, wherein the polyester-imide resin is dissolved in a mixture of ethylene glycol diacetate and diethylene glycol diethyl ether.

* * * * *